United States Patent [19]

Wright

[11] Patent Number: 5,277,866
[45] Date of Patent: Jan. 11, 1994

[54] METHOD OF INJECTION MOLDING A HOLLOW GOLF CLUB

[75] Inventor: Charles W. Wright, Hough, England

[73] Assignee: Oakbray Investment Company, Ltd., England

[21] Appl. No.: 773,914

[22] PCT Filed: Apr. 24, 1990

[86] PCT No.: PCT/GB90/00631

§ 371 Date: Oct. 25, 1991

§ 102(e) Date: Oct. 25, 1991

[87] PCT Pub. No.: WO90/12679

PCT Pub. Date: Nov. 1, 1990

[30] Foreign Application Priority Data

Apr. 25, 1989 [GB] United Kingdom ............... 8909376

[51] Int. Cl.$^5$ ................ B29C 45/00; A63B 53/10
[52] U.S. Cl. ................ 264/572; 273/80 R; 273/167 H; 264/271.1; 264/328.18
[58] Field of Search ............ 264/257, 258, 313, 314, 264/317, 572, 328.1, 85, 328.18, 271.1; 273/80 R, 80 B, 167 H, DIG. 7

[56] References Cited

U.S. PATENT DOCUMENTS

| | | | |
|---|---|---|---|
| 1,038,429 | 9/1912 | Penny | 273/80 R |
| 3,387,844 | 6/1968 | Shipper | 273/167 H |
| 4,451,042 | 5/1984 | Hayashi et al. | 273/167 H |
| 4,575,447 | 3/1986 | Hariguchi | 273/167 R |
| 4,581,190 | 4/1986 | Nagamoto et al. | 273/167 H |
| 4,650,626 | 3/1987 | Kurokawa | 264/278 |
| 4,697,813 | 10/1987 | Inoue | 273/167 H |
| 4,778,185 | 10/1988 | Kwokawa | 273/167 H |
| 4,826,645 | 5/1989 | Angus | 264/108 |
| 4,863,771 | 9/1989 | Freeman | 264/257 |
| 4,883,623 | 11/1989 | Nagamoto et al. | 264/108 |
| 4,896,885 | 1/1990 | Kajita et al. | 273/167 H |
| 4,928,965 | 5/1990 | Yamaguchi et al. | 273/167 H |
| 4,935,185 | 6/1990 | Mott | 264/257 |
| 4,936,582 | 6/1990 | Bernstein | 273/162 R |
| 4,954,198 | 9/1990 | Viellard | 273/80 R |
| 4,968,474 | 11/1990 | Ito | 264/257 |
| 5,007,643 | 4/1991 | Okumoto et al. | 273/167 R |
| 5,071,123 | 12/1991 | Spector | 273/80 R |
| 5,075,056 | 12/1991 | Umlauft et al. | 264/572 |
| 5,093,050 | 3/1992 | Tepic | 264/108 |

FOREIGN PATENT DOCUMENTS 1201648  8/1970  United Kingdom ............... 273/78

OTHER PUBLICATIONS

Anon., Webster's New Collegiate Dictionary, Merriam Webster, Springfield Mass (1977), p. 173.
Anon., Modern Plastics Encyclopedia 88 Modern Plastics Mag. 1988 pp. 183–184, 189, 190 & 193.
Brady et al, "Materials Handbook", McGraw-Hill, N.Y. (1957) pp. 800 and 801.

Primary Examiner—Jay H. Woo
Assistant Examiner—Robert B. Davis
Attorney, Agent, or Firm—W. Thad Adams, III

[57] ABSTRACT

A method of manufacturing a gold club including feeding a predetermined weight of aramid reinforced nylon thermoplastic material from a screw of an injection molding system into a suitably shaped mold. After an initial portion of the thermoplastic has passed into the mold a stream of a predetermined volume of nitrogen under pressure is introduced into the thermoplastic feed to urge the thermoplastic against the inner walls of the mold to form a hollow club. When the feed and stream into the mold have been completed, the mold is maintained under pressure for a period of time to allow the thermoplastic to set before the nitrogen is released.

15 Claims, 3 Drawing Sheets

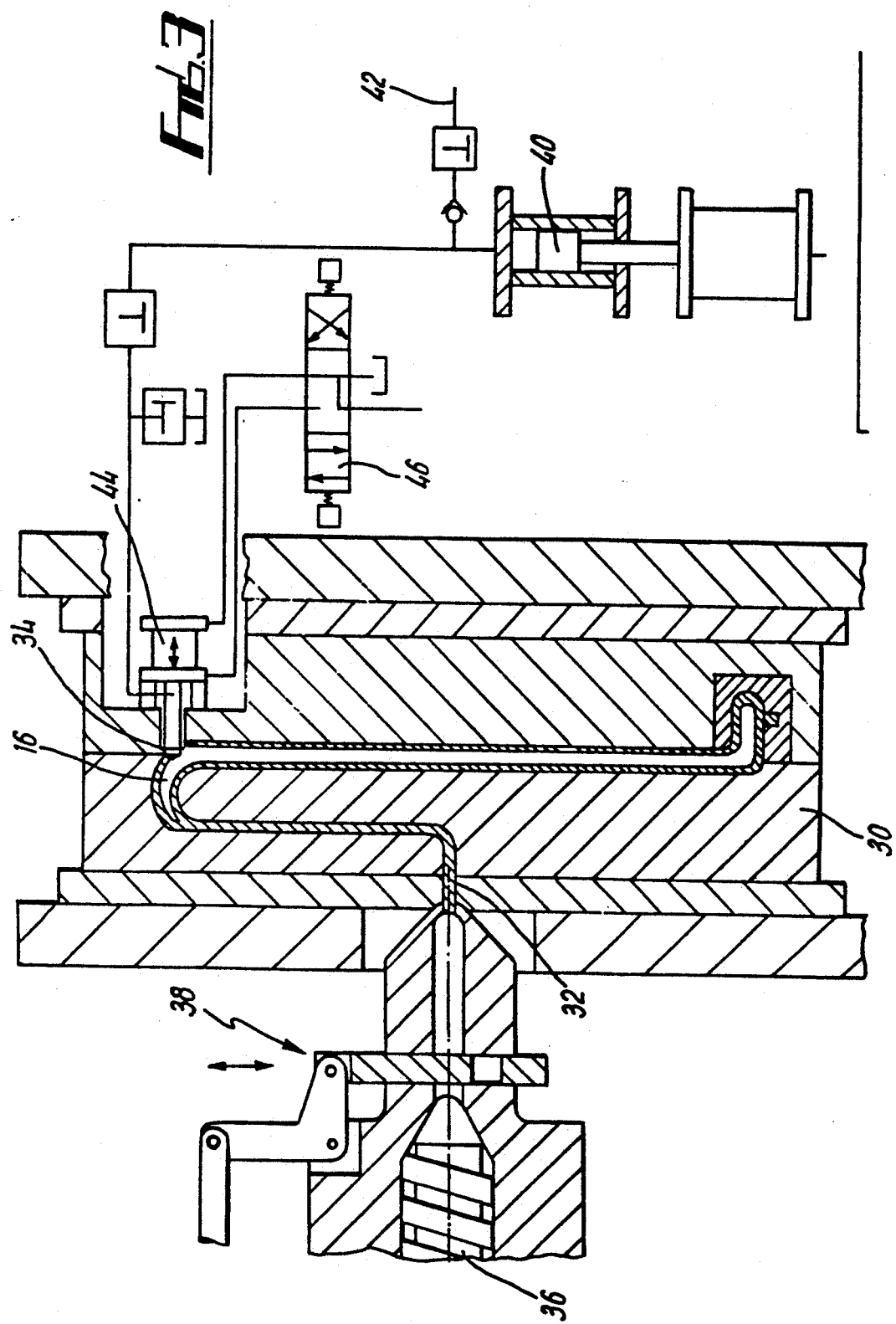

METHOD OF INJECTION MOLDING A HOLLOW GOLF CLUB

This is a national stage application of PCT application number PCT/GB 90/00631.

FIELD OF THE INVENTION

This invention concerns improvements in or relating to golf clubs and particularly but not exclusively to a method of manufacturing a golf club with an integral head and shaft.

SUMMARY OF THE INVENTION

According to the present invention there is provided a method of manufacturing a golf club by injection molding, the method comprising introducing a required volume of polymer into a correspondingly shaped mold, introducing a required volume of pressurised fluid such that the fluid urges the polymer to line the walls of the mold, and maintaining the fluid under pressure for a predetermined period of time to allow the hollow club thus formed to cool, the polymer being fed into the mold such that the wall thickness of the shaft of the club increases towards the head of the club.

The fluid is preferably introduced into the mold simultaneously with the polymer after a first portion of the polymer has already been introduced thereinto.

The fluid and polymer may be introduced into the mold at substantially the same location. Alternatively the fluid may be introduced into the mold downstream of introduction of the polymer.

Preferably the polymer includes reinforcing fibers which may be of the long grade type. The polymer may be nylon or acetal, and the fibers may be glass, aramid, or carbon.

A sole plate and/or other items may be positioned in the mold prior to molding, to be incorporated into the club head.

The mold may be shaped such that openings are formed extending in to the club head which can subsequently be filled with a relatively dense material to weight the club.

A filler may be provided in the polymer such as talcum powder.

After molding the club may be filled with a curable material which may be resinous.

Also according to the present invention there is provided a golf club manufactured by a method according to any of the preceding eight paragraphs.

Examples of how the invention may be carried out will now be described by way of example only with reference to the accompanying drawings.

BRIEF DESCRIPTION OF THE DRAWINGS

FIG. 3 is a diagrammatic plan view of apparatus usable with the invention.

DESCRIPTION OF THE PREFERRED EMBODIMENTS

A golf club may be formed by feeding a predetermined weight of aramid reinforced nylon thermoplastics material from the screw of an injection molding system into the handle end of a suitably shaped mold. After an initial portion of the thermoplastic has passed into the mold a stream of a predetermined volume of nitrogen under pressure is introduced into the center of the thermoplastic feed to urge the thermoplastic against the inner walls of the mold to form a hollow club. When the feed and stream into the mold have been completed, the mold is maintained under pressure for a period of time, e.g. twenty seconds, to allow the thermoplastic to set. The nitrogen is then released and the mold opened to release the club.

The aramid fibers are of the long grade type and will be typically 10 mm long as opposed to 0.2–0.4 mm for short grade type fibers. This length of fibers gives a relatively stiff shaft.

If required a sole plate can be positioned in the mold prior to molding which will adhere to the thermoplastic to provide weight in the required position on the base of the club's head and also protection against abrasion from rubbing on the ground. The sole plate can be made from any suitable material such as brass. The sole plate can be aligned in the mold such that the club being formed adopts the correct lie for a particular player. For example a taller player holds any one club at a greater angle to the vertical than a shorter player holds the same club, but preferably the base of the club should still be parallel to the ground for both players.

The polymer is fed into the mold such that the shaft thickness increases towards the club head. This variation in shaft thickness provides an advantageous whip action when playing a shot.

The provision of a hollow head will tend to provide a larger than normal "sweet spot", and if a shot is hit slightly off centre on the side edge of the "sweet spot" the head will tend to correct the skew of the shot due to the flexing of the face of the club. The hollow construction of the shaft and head tends to relieve the stress which is likely to be encountered in solid components when injection molded.

If required, after molding the club may be filled with a curable material which may be resinous.

Whilst the fibers in the shaft will lie predominantly in a generally longitudinal alignment, some will cross over thus reducing any relative rotation of the shaft. Conventionaly fiber reinforced shafts are extruded or laid, and nearly all the fibers tend to a substantially longitudinal alignment. The provision of an integral shaft and head, with the fibers in the head aligned predominantly substantially perpendicular to the fibers in the shaft will reduce rotation of the head about the shaft which can be experienced when the shaft and head are separate components.

Figure 1:
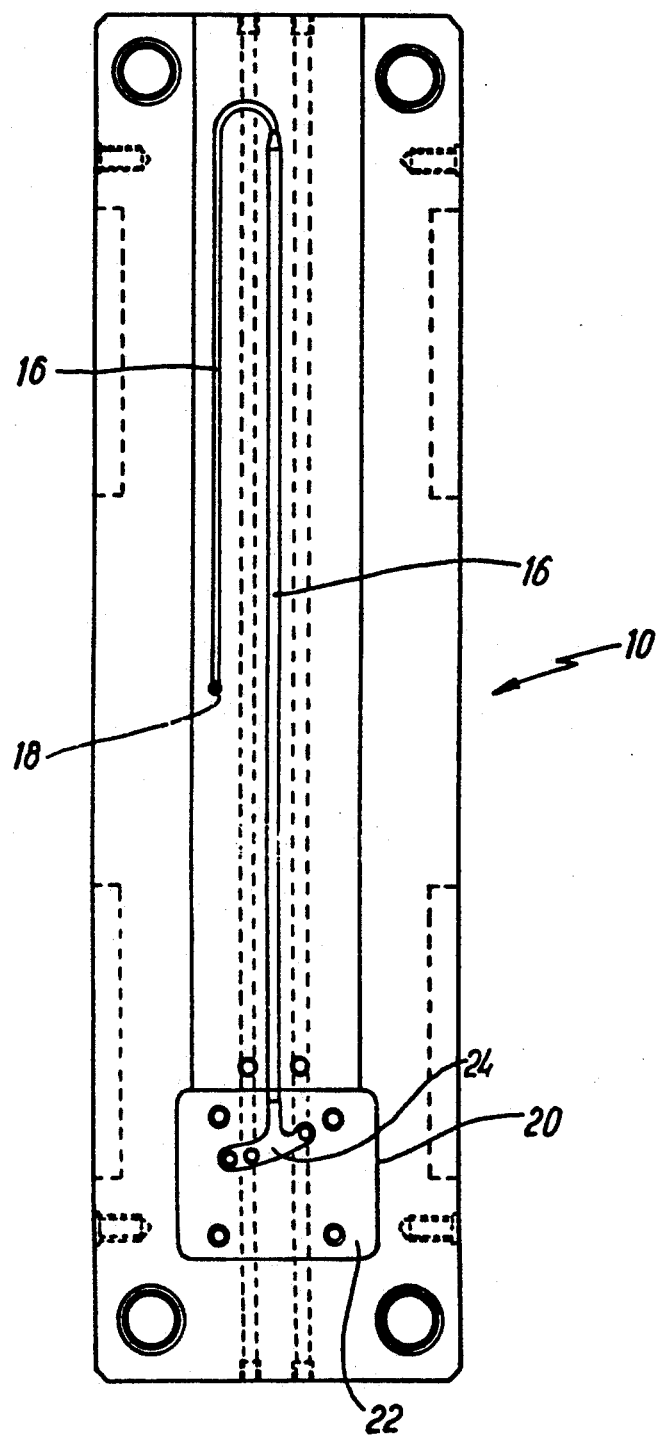
FIG. 1 is a diagrammatic plan view of a mold usable with the invention.
Figure 2:
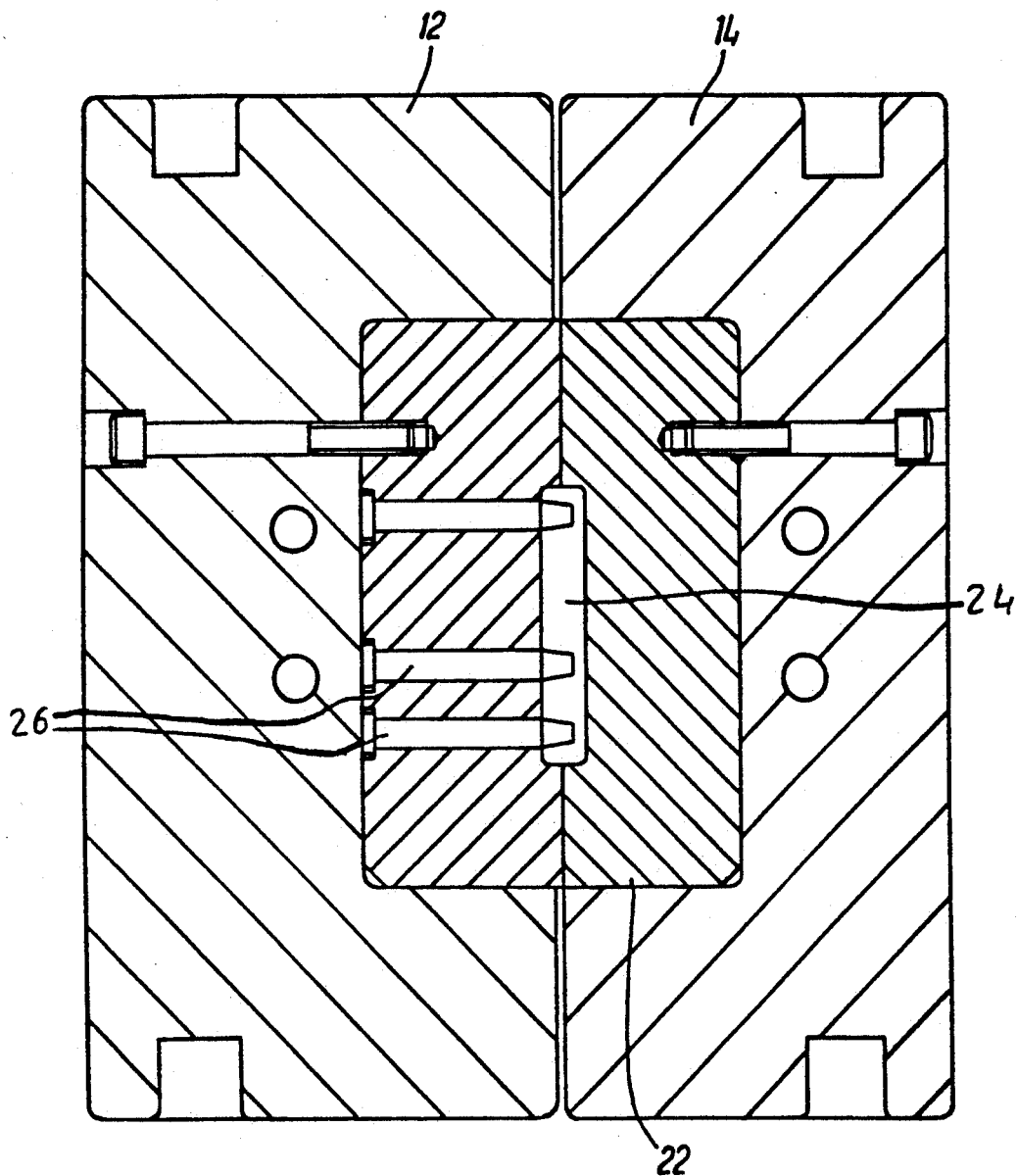
FIG. 2 is a cross-sectional side view of the mold of FIG. 1.

FIGS. 1 and 2 show a mold 10 suitable for use with such a method. The mold 10 is generally elongate and comprises two main detachable parts 12, 14. The mold 10 defines an elongate channel 16 extending from an inlet 18 substantially midway along the mold 10 to a point adjacent one end, through a 180° turn to extend to connect with a cavity 20 adjacent the other end. The cavity 20 locates a two piece head mold 22 defining a chamber 24 connecting with the channel 16. The golf club being formed with a shaft formed in the part of the channel 16 extending into the cavity 20 and the head formed in the chamber 24. Fingers 26 are provided in the mold 22 extending into the chamber 24 to produce openings into the golf club head which may be filled with a relatively dense material to weight the club. Different molds 22 can obviously by placed in the chamber 24 to form different clubs.

With the mold 10 a stream of nitrogen and the thermoplastic feed are introduced at the same location, the inlet 18. FIG. 3 shows a system using a mold 30 in which the thermoplastic feed is introduced at a first inlet 32 and the stream of nitrogen is introduced at a second inlet 34 adjacent the turn in the channel 16. The thermoplastic feed comes from the screw 36 of an injection molding system through a valve 38. The stream of nitrogen issues from a cylinder 40 connected to a supply of nitrogen 42 and is urged into the mold by a hydraulic cylinder 44 controlled by a valve 46.

There is thus described a method of producing a golf club, and a golf club produced by that method, which have a number of advantageous features. It is to be appreciated that various other modifications may be made without departing from the scope of the invention. For example clubs of different weights can easily be produced by using polymers of different densities. Different length reinforcing fibers can be used to provide shafts of different stiffness. Many other materials than those outlined above can be used for making the clubs. Instead of nylon, acetal may be used. A filler such as talcum powder may be included in the polymer.

The same mold could be used to make a number of different clubs using different head molds, and suitable inserts could be provided for the mold for the different features on different clubs. If required the head could be filled with material such as molten metal to add weight thereto and vary the striking characteristic of the golf club. The method can be used for both woods and irons. Irons could have a solid head or a head with one or more hollow compartments.

I claim:

1. A method of manufacturing a golf club by injection molding, the method comprising:
   (a) introducing a required volume of polymer into a mold which has walls shaped to produce a golf club having a head and shaft, wherein said shaft and head are an integrally-formed and simultaneously molded shaft and head, the polymer being introduced into the mold such that the wall thickness of the shaft of the club increases towards the head of the club;
   (b) introducing a required volume of pressurized fluid into the mold such that the fluid urges the polymer to line the walls of the mold; and
   (c) maintaining the fluid in the mold under pressure for a predetermined period of time to allow the hollow club thus formed to cool, said polymer mixed with fibers being injected into said mold at an end of a shaft-defining portion of the mold remote from a head defining portion of the mold and caused to flow from said end to and into said head defining portion to integrally form said shaft and said head and hardening said polymer.

2. A method according to claim 1, wherein the step of introducing the polymer into the mold comprises the steps of introducing a first portion of polymer into the mold, and subsequently introducing a second portion of polymer into the mold simultaneously with the introduction of the fluid into the mold.

3. A method according to claim 1, and including the step of introducing the pressurized fluid and polymer into the mold at substantially the same location.

4. A method according to claim 1, and including the step of introducing the fluid into the mold downstream of point of introduction of the polymer.

5. A method according to claim 1, wherein the reinforcing fibers are of the long grade type approximately 10 mm in length.

6. A method according to claim 1, wherein the reinforcing fibers are glass.

7. A method according to claim 1, wherein the reinforcing fibers are aramid.

8. A method according to claim 1, wherein the reinforcing fibers are carbon.

9. A method according to claim 1, and including the step of introducing a club head shaping device into the mold prior to molding, for incorporation into the club head as the molding steps occur.

10. A method according to claim 1, wherein the part of the mold which when filled forms the club head is shaped such that openings are formed extending into the club head for receiving weighting material in the finished club head.

11. A method according to claim 1, and including the step of adding a filler to the polymer.

12. A method according to claim 11, wherein the filler is talcum powder.

13. A method according to claim 1, and including the step of filling the club with a curable material after the club is molded.

14. A method according to claim 13, wherein the curable material is comprises a resinous material.

15. A method according to claim 1, and including the step of introducing a sole plate into the mold prior to molding, for incorporation into the club head as the molding steps occur.

* * * * *